United States Patent [19]
Taguchi et al.

[11] Patent Number: 4,929,092
[45] Date of Patent: May 29, 1990

[54] RESISTANCE TEMPERATURE DETECTOR

[75] Inventors: Seizo Taguchi; Toshiharu Oketani; Michihiro Ohashi; Hideaki Tanaka, all of Kobe; Hiroshi Terao, Akashi, all of Japan

[73] Assignees: Mitsubishi Jukogyo Kabushiki Kaisha, Tokyo; Kabushiki Kaisha Okazaki Seisakusho, Hyogo, both of Japan

[21] Appl. No.: 198,495

[22] Filed: May 25, 1988

[30] Foreign Application Priority Data

Jun. 12, 1987 [JP] Japan ................. 62-145313
Sep. 16, 1987 [JP] Japan ................. 62-140002[U]

[51] Int. Cl.$^5$ ............................................. H01C 7/02
[52] U.S. Cl. ................................... 374/183; 374/208; 338/239; 338/243
[58] Field of Search ............... 374/183, 185, 166, 148, 374/147, 208; 376/247; 338/243, 239, 22; 136/230, 232, 233, 237

[56] References Cited

U.S. PATENT DOCUMENTS

| | | | |
|---|---|---|---|
| 2,703,833 | 3/1955 | Vanvor ................. | 374/185 |
| 3,188,866 | 6/1965 | Mayer ................. | 736/233 |
| 3,893,058 | 7/1975 | Keith ................. | 374/185 |
| 3,928,837 | 12/1975 | Espér et al. ........... | 338/32 R |
| 3,952,276 | 4/1976 | Walch et al. ........... | 374/208 |
| 3,955,419 | 5/1976 | Barton et al. .......... | 374/166 |
| 4,087,775 | 5/1978 | MacKenzie et al. ..... | 338/243 |
| 4,398,169 | 8/1983 | Hayashi ................ | 374/185 |
| 4,575,705 | 3/1986 | Gotcher ................ | 374/183 |
| 4,586,246 | 5/1986 | Oskoui ................. | 338/28 |
| 4,653,935 | 3/1987 | Daily et al. ........... | 374/208 |
| 4,666,656 | 5/1987 | Bertrand ............... | 376/247 |
| 4,670,212 | 6/1987 | Geoffray et al. ........ | 376/247 |
| 4,708,844 | 11/1987 | Kearton et al. ........ | 376/247 |
| 4,778,538 | 10/1988 | Lyman ................. | 374/208 |
| 4,830,515 | 5/1989 | Cortes ................. | 374/208 |

FOREIGN PATENT DOCUMENTS

| | | | |
|---|---|---|---|
| 359166 | 10/1980 | Austria . | |
| 0153661 | 9/1985 | European Pat. Off. ........... | 374/183 |
| 2503591 | 8/1975 | Fed. Rep. of Germany ....... | 244/73 |
| 2293701 | 12/1974 | France ................ | 374/185 |
| 1385930 | 3/1975 | United Kingdom ....... | 374/185 |

*Primary Examiner*—Allan N. Shoap
*Assistant Examiner*—Jeffrey J. Hohenshell
*Attorney, Agent, or Firm*—Wenderoth, Lind & Ponack

[57] ABSTRACT

A resistance temperature detector measures the temperature of fluid flowing through a pipe at a given point in the pipe. In the temperature detector, normal and backup temperature sensing resistance elements are secured with inorganic adhesive onto an inner wall surface of a thin-walled tubular sheath having its tip end closed. These temperature sensing resistance elements are disposed in spaced parallel relationship and are respectively connected to insulated lead wires separately disposed within the resistance temperature detector. The resistance temperature detector also includes a sheath cable assembly having sheathed cables, each of which is electrically connected to a respective one of the insulated lead wires and secured to the other end of the tubular sheath. Thereby a sealed vacant space is defined within the temperature sensing assembly. The detector also includes preferred structure for the temperature sensing resistance element and preferable well structures to house the proposed resistance temperature detector.

14 Claims, 6 Drawing Sheets

RESISTANCE TEMPERATURE DETECTOR

BACKGROUND OF THE INVENTION

1. Field of the Invention:

The present invention relates to a resistance temperature detector having quick response and high reliability for measuring the varying temperature of a high-pressure liquid such as a coolant in a pressurized water reactor and a mounting structure for the detector, and more particularly to a resistance temperature detector provided with both normal and backup temperature sensing elements.

2. Description of the Prior Art:

Operation and control of an atomic power plant are required to have extremely high safety, and hence, detectors for detecting various parameters to be used in that control, for instance, temperature detectors, are required to have high reliability. In a resistance temperature detector that is widely used, the most likely fault is a breakdown of a resistance wire, but since it is difficult to prevent this fault, it has been a common practice to provide normal and backup resistance temperature detectors.

Figure 12:
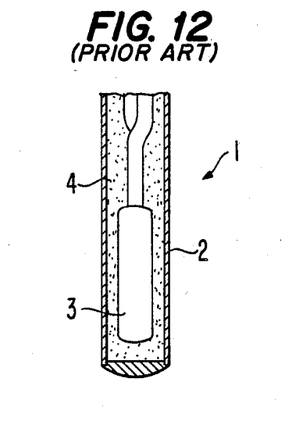
FIG. 12 is a cross-sectional side view of a prior art resistance temperature detector.

FIG. 12 shows a cross-section of one example of a prior art resistance temperature detector for measuring the temperature of a high-pressure fluid.

Figure 13:
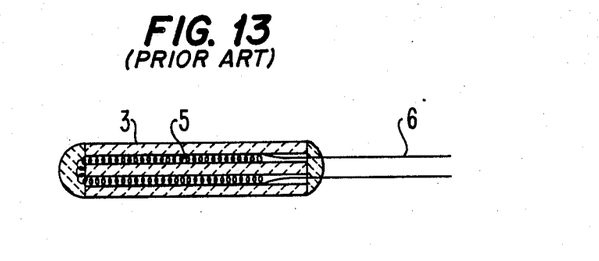
FIG. 13 is a cross-sectional side view of a ceramic sinter type temperature sensing resistance element in the same prior art resistance temperature detector.

In a resistance temperature detector 1, a ceramic sinter-type temperature sensing resistance element 3 is disposed within a protective case 2, and the space within the protective case 2 is filled with filler material 4 consisting of magnesium oxide (MgO). As shown in FIG. 13, within the ceramic sinter type temperature sensing resistance element 3 is assembled a double element 5, and lead wires 6 of the double element 5 are connected to an integral sheath cable (not shown).

The resistance temperature detector 1 is disposed within the fluid, and temperature measurement for the fluid is carried out.

Figure 14:
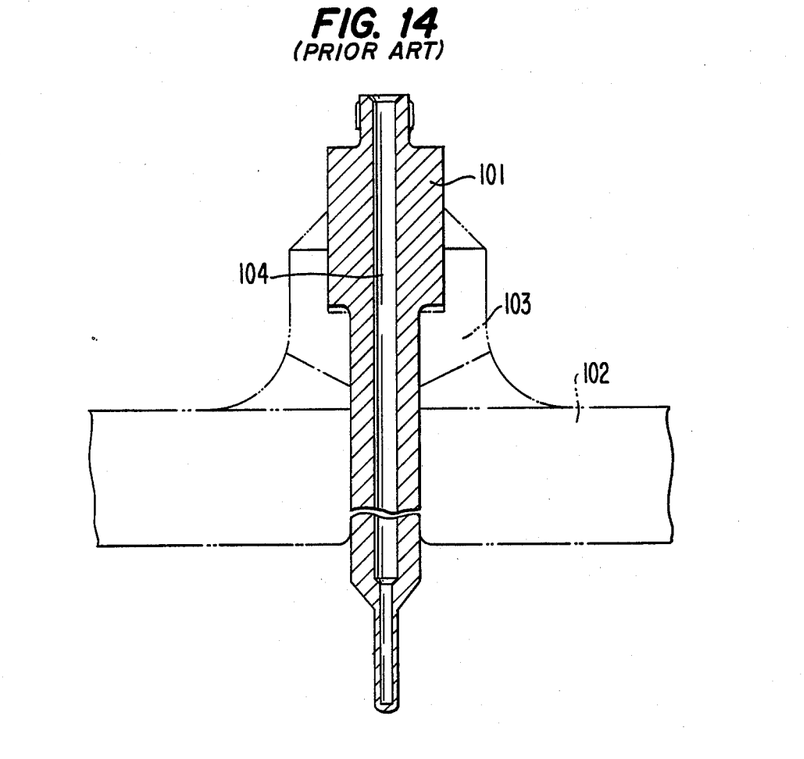
FIG. 14 is a cross-sectional side view of a well structure for a prior art resistance temperature detector.

In addition, FIG. 14 shows a cross-sectional side view of a prior art well for a resistance temperature detector.

A well structure for a resistance temperature detector (hereinafter abbreviated as "RTD well structure") 101 is mounted by welding tube stub 103 to a pipe 102 through which highly pressurized fluid flows. RTD well structure 101 is formed with a single insert portion 104 in which a resistance temperature detector (hereinafter abbreviated as "RTD") is inserted and held, and the tip end of the insert portion 104 is positioned within the pipe 102.

The fluid flowing through the pipe 102 comes into contact with the tip end of the insert portion 104, and the temperature of the fluid within the pipe 102 is measured by the RTD inserted and held in the insert portion 104.

With regard to this type of resistance temperature detector, in order to insure continuity of control it is desirable to dispose dual temperature detectors, that is, normal and backup temperature detectors at the same location.

Moreover, since the temperature of a coolant could vary abruptly, the RTD must have a quick response rate.

Futhermore, the response rate may possibly be degraded during use of the temperature temperatures detector.

Therefore, in order to insure safety and reliability of control, it has been increasingly demanded to dispose a plurality of temperature detectors at the same location, to continuously check soundness of the temperature detectors during a controlled operation, and to use the output of the temperature detector operating normally.

Accordingly, a resistance temperature detector which meets the above-mentioned demands is desirable.

However, the above-described prior art temperature detector 1 shown in FIG. 12 involved multiple problems. First, as an unseparated double element 5 was used, if any fault occurred in the resistance temperature detector 1, it was impossible to continue measurement at the same location by means of a backup resistance temperature detector. Second in the resistance temperature detector 1 of the prior art, since the filler material 4 filled the protective case 2 and the ceramic sinter type temperature sensing resistance element 3 was buried within the filler material, the inside of the protective case 2 was not hollow, the thermal inertia of that portion of the protective case 2 was increased by the existence of the filler material 4, and also, since the ceramic sinter type temperature sensing resistance element 3 was not held in tight contact with the inner wall surface of the protective case 2, delay of heat transmission from the outside occurred. Accordingly, these factors restricted the response rate of the resistance temperature detector 1. In addition, since the filler material 4 consisted of magnesium oxide, its hygroscopicity was high. Third, as the sheath cable was of an integral type, where two resistance temperature detectors 1 consisting of, for instance, normal and backup temperature detectors were used, degradation of insulation due to high temperature could occur between the lead wires 6, causing a shunt circuit to be created between the lead wires 6. Therefore, in an important temperature measuring system there was a possibility that a serious problem might result.

Furthermore, in the above-described prior art RTD well structure 101 shown in FIG. 14, as only one insert portion 104 was formed, the number of RTD's that could be held in one RTD well structure 101 was limited to one. Accordingly, in the event that in a temperature measuring scheme making use of RTDs it is required to provide a backup RTD in addition to a normal RTD, an additional RTD well structure 101 must be provided at a separate location. In order to to provide an additional RTD well structure 101, it is necessary to provide a new hole and a new tube stub 103 on the pipe 102, and hence material and labor costs are increased. In addition, while the normal RTD and the backup RTD should measure the temperature at the same location, in the case where the additional RTD well structure 101 is provided at a separate location, the normal and backup RTDs necessarily perform temperature measurement at separate fluid locations, that is, at locations where thermo-hydraulic conditions are different, resulting in the applicability of the measurement by the backup RTD being reduced.

SUMMARY OF THE INVENTION

The present invention addresses the first-mentioned problem in the prior art, and the invention has as an object the provision of a resistance temperature detector in which normal and backup resistance elements are disposed on an inner wall surface of a temperature sensing assembly having a hollow space therein, and lead wires of the resistance elements are connected to independent sheath cables, whereby improvements in response time and reliability may be achieved.

Also, the present invention addresses the last-mentioned problem in the prior art, and the invention has as another object the provision of a temperature measuring arrangement having a well structure for resistance temperature detectors, which structure can hold a plurality of resistance temperature detectors without degrading reliability of measurement.

According to one feature of the present invention, there is provided a resistance temperature detector comprising a thin-walled tubular sheath temperature sensing assembly having its tip end closed, normal and backup temperature sensing resistance elements secured with inorganic adhesive onto an inner surface of the tubular sheath temperature sensing assembly in parallel relationship and spaced apart from each other, insulated lead wires separately disposed, each of which is connected to a corresponding one of the temperature sensing resistance elements, and a sheathed cable assembly having sheath cables, each of which is electrically connected to respective ones of the insulated lead wires and secured to the other end of the temperature sensing assembly to thereby define a sealed vacant space therein.

According to another feature of the present invention, there is provided a resistance temperature detector, wherein each of the temperature sensing resistance elements includes an elongated ceramic mandrel, a resistance wire spirally wound around the ceramic mandrel, a pair of end plates disposed at the opposite ends of the ceramic mandrel, and a ceramic tube surrounding the resistance wire.

According to still another feature of the present invention, there is provided an arrangement for measuring the temperature of a highly pressurized fluid flow in a pipe or the like, comprising a well structure secured to the pipe and protruded into the interior of the fluid flow, the well structure being provided with at least two separate nipple-shaped protrusions, each of which defines a dry well therein, and at least a pair of resistance temperature detectors separately installed in respective ones of the dry wells defined in the well structure.

According to the present invention, due to the fact that two normal and backup temperature sensing resistance elements are disposed within a thinwalled tubular sheath temperature sensing assembly, even if one of the temperature sensing resistance elements has become faulty, temperature measurement can still be done at the same location by means of the other temperature sensing resistance element.

Moreover, according to the present invention, since the temperature sensing resistance elements are secured onto an inner surface of a thin-walled tubular sheath assembly, the distance between the outside fluid and the resistance elements is small, hence thermal conductivity is enhanced, and also, since a sealed vacant space is formed within the temperature sensing assembly, the thermal inertia of the temperature sensing assembly is small, and thereby the response rate is improved. In addition, as the lead wires of the respective resistance elements are respectively connected to independent sheath cables, degradation of insulation would not occur between the wirings for the respective resistance elements, and so, reliability is enhanced.

Furthermore, according to the present invention, a plurality of resistance temperature detectors can be held by a single well structure, and so, measurement by means of a normal or backup resistance temperature detector can be carried out at the same place. Since the dry wells in which the resistance temperature detectors are inserted are formed independently of each other as nipple-shaped protrusions adapted to accommodate resistance temperature detectors, the fluid can come close to the protrusions under equal thermo-hydraulic conditions.

The above mentioned and other objects, features and advantages of the present invention will become more apparent by reference to the following description of the preferred embodiments of the invention taken in conjunction with the accompanying drawings.

DESCRIPTION OF THE PREFERRED EMBODIMENTS

Initially, one preferred embodiment of the present invention will be described with reference to FIGS. 1 to 6.

Figure 1:
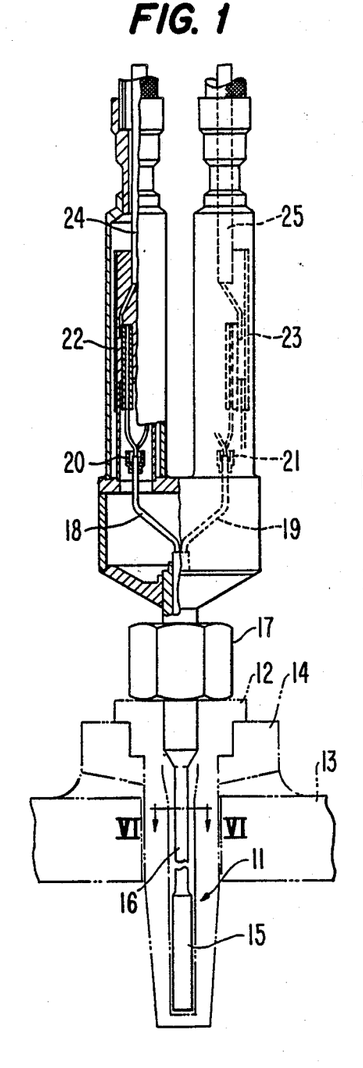
FIG. 1 is a side view in partial section of a temperature measuring apparatus provided with a resistance temperature detector according to one preferred embodiment of the present invention.

As shown in FIG. 1, a well 12 for holding a resistance temperature detector 11 is welded to a tube stub 14 provided on a pipe 13. A resistance temperature detector 11 consists of a thin-walled tubular sheath temperature sensing assembly 15 and a sheath cable assembly 16 connected thereto, and the resistance temperature detector 11 is inserted into the well 12 and fixed there by means of a cap nut 17, such that the detector 11 may measure the fluid temperature within the pipe 13. Lead wires 18 and 19 extending from the sheath cable assembly 16 are, after passing through terminals 20 and 21, connected by silver soldering to corresponding outer cables 24 and 25, respectively, by means of outer cable connectors 22 and 23.

Figures 2, 3, 4:
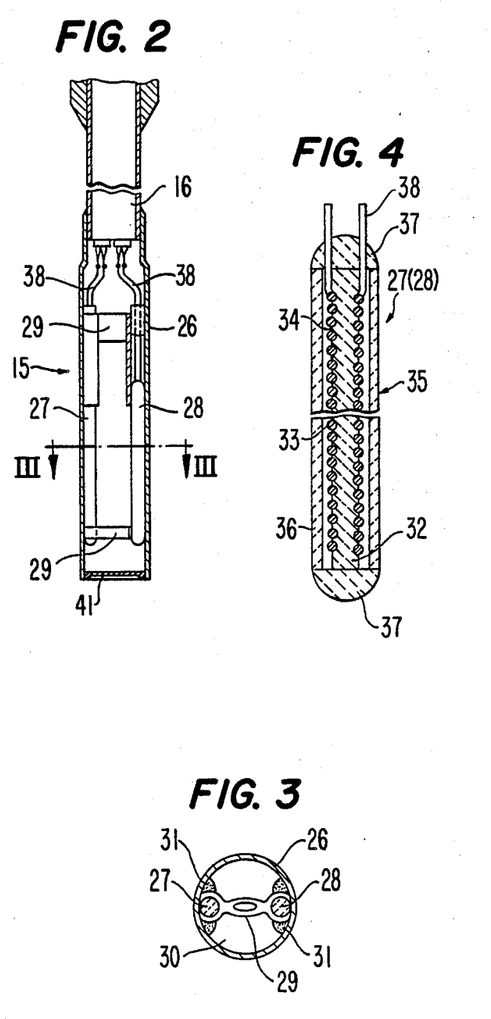
FIG. 2 is a cross-sectional side view of the resistance temperature detector of FIG. 1.
FIG. 3 is a transverse cross-sectional view taken along line III—III in FIG. 2.
FIG. 4 is a cross-sectional side view of a ceramic sinter type temperature sensing resistance element.
Figure 5:
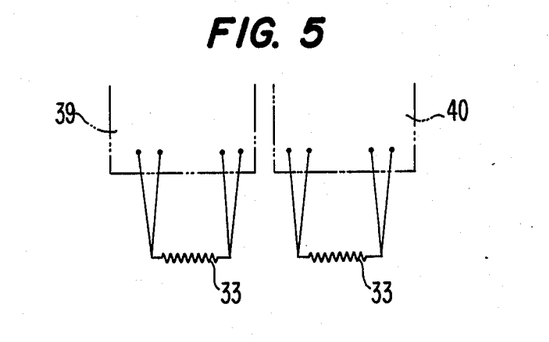
FIG. 5 is a wiring diagram for the temperature sensing resistance elements.

As shown in FIGS. 2 and 3, the thin-walled tubular sheath temperature sensing assembly 15 is composed of a protective case 26 and two ceramic sinter-type temperature sensing resistance elements 27 and 28 serving as resistance elements, one resistance element being provided for normal use, but the other being provided for backup use. The protective case 26 has a thin-walled tubular shape of about 6.5 mm in diameter and about 40 mm in length. Ceramic sinter-type temperature sensing resistance elements 27 and 28, which are about 1.2 mm in diameter and about 18 mm in length, are secured to the inner surface of case 26 at an angular interval of 180° and are separated by a spacer 29 such that a vacant space is formed within the protective case 26. The ceramic sinter-type temperature sensing resistance elements 27 and 28 are secured by an inorganic adhesive 31 having appropriate resistance to thermal and radiation degradation and a high thermal conductivity.

As shown in FIG. 4, each of the ceramic sinter-type temperature sensing resistance elements 27 and 28 is composed of a coil-shaped resistance element 34, in which a temperature sensing resistance wire 33 made of platinum is wound in a coil shape around an elongated ceramic mandrel 32, and a ceramic outer shell 35. The ceramic outer shell 35 consists of a ceramic tube 36 surrounding the sensing resistance wire 33 and a pair of end plates 37 disposed at the opposite ends of the ceramic mandrel 32. Two insulated lead wires 38 are led out from each of the ceramic sinter-type temperature sensing resistance elements 27 and 28. In addition, with reference to FIG. 2, the bottom end of the protective case 26 is sealingly closed by welding an end plate 41 thereto, while at the top end of the protective case 26 is mounted the sheath cable assembly 16. A sealed vacant space 30 is thus formed within the protective case 26.

Figure 6:
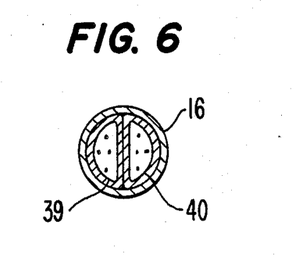
FIG. 6 is a transverse cross-sectional view taken along line VI—VI in FIG. 1.

As shown in FIG. 6, within the sheath cable assembly 16 are provided two sheath cables 39 and 40, each having a semi-circular cross-section, wrapped by an outer wall of the sheath cable assembly 16. In these sheath cables 39 and 40, magnesium oxide (MgO) is used as an insulator, and Ni wires are used as core wires. The lead wires 38 of the ceramic sinter-type temperature sensing elements 27 and 28 are respectively connected to the sheath cables 39 and 40.

The above-described resistance temperature detector 11 is mounted within the well 12 to perform temperature measurement of the fluid within the pipe 13.

Figure 7:
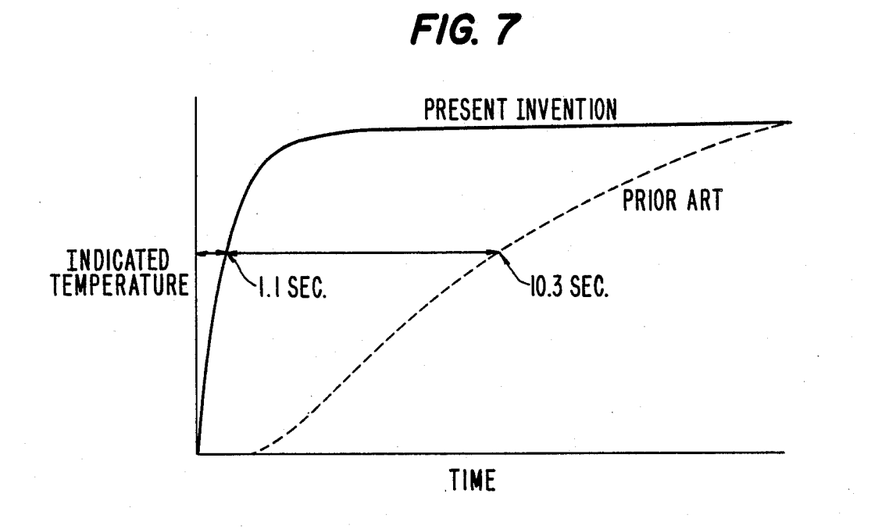
FIG. 7 is a diagram comparatively showing response characteristics according to the present invention and the prior art.

In the above-described resistance temperature detector 11, since the ceramic sinter-type temperature sensing resistance elements 27 and 28 are secured to the inner surface of the thin-walled protective case 26, the ceramic sinter-type temperature sensing resistance elements 27 and 28 are near to the outer fluid the temperature of which is to be measured. Furthermore, the ceramic sinter-type temperature sensing resistance elements 27 and 28 are secured to the protective case 26 by means of inorganic adhesive 31 having appropriate resistance to thermal and radiation degradation and high thermal conductivity. Heat transmission between the outer fluid whose temperature is to be measured and the ceramic sinter-type temperature sensing resistance elements 27 and 28 is high, and moisture resistance, and resistance to thermal and radiation degradation are also excellent. Moreover, since the temperature sensing resistance element assembly 15 contains only the ceramic sinter-type temperature sensing resistance elements 27 and 28 therein and the remaining vacant space 30 consists entirely of air, thermal inertia of the temperature sensing resistance element assembly 15 is small. As a result, as shown in FIG. 7, in contrast to the response in about 10.3 seconds of the prior art (illustrated by a dotted line curve in FIG. 7), the resistance temperature detector 11 according to the present invention can respond in about 1.1 seconds (illustrated by a solid line curve in FIG. 7), and thus, response times can be improved.

In addition, owing to the fact that the lead wires 38 of the ceramic sinter-type temperature sensing resistance elements 27 and 28 are respectively connected to the sheath cables 39 and 40 which are independent of each other, the possibility that a shunting phenomenon caused by high temperatures may arise between the conductors of the respective ceramic sinter type temperature sensing resistance elements 27 and 28 is eliminated, and contact between the conductors can be prevented. Consequently, where measurement is of the temperature of a fluid in which the temperature distribution at various positions in a pipe is not uniform due to insufficient mixing of the fluid within the pipe such as, for instance, a coolant within a hot leg pipe for a primary coolant in an atomic reactor, by employing the resistance temperature detector 11, measurements can be made with the temperature detecting positions for normal use and for backup use made to precisely coinciding with each other.

Figure 8:
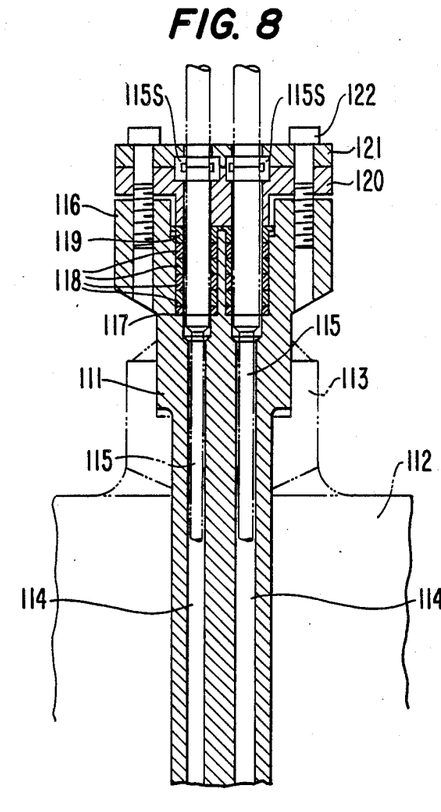
FIG. 8 is a cross-sectional side view of a temperature measuring arrangement according to another preferred embodiment of the present invention.
Figure 9:
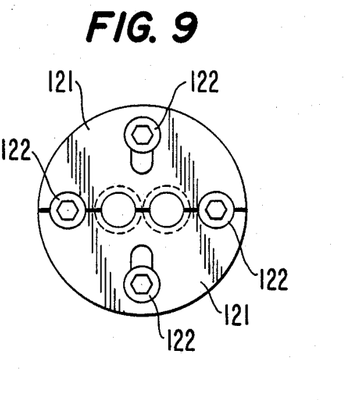
FIG. 9 is a plan view of the arrangement of FIG. 9.

Next, a temperature measuring arrangement for a highly pressurized fluid flow according to another preferred embodiment of the present invention will be described with reference to FIGS. 8 to 11. In FIG. 8, a resistance temperature detector well structure (hereinafter abbreviated as "RTD well structure") 111 made of stainless steel is welded to a tube stub 113 provided on a pipe 112 which carries a highly pressurized fluid flow to be measured. Within the RTD well structure 111 are formed two insert holes 114 for inserting resistance temperature detectors, and a resistance temperature detector (hereinafter abbreviated as "RTD") 115 is inserted into each of the insert holes 114. It is to be noted that while two insert holes 114 are formed in the illustrated embodiment, the present invention is not limited to two insert holes.

At the top of the RTD well structure 111 is provided a sealing section drum body 116, and within this sealing section drum body 116 are fitted a bottom ring 117 made of stainless steel, seal packings 118 and a junk ring 119 made of stainless steel and having a cylindrical body and a collar, sequentially, from bottom to top. The junk ring 119 is pressed by bolts 122 via a flange type press metal 120 and slit plates 121, and hence the seal packings 118 placed under the junk ring 119 are compressed. The RTDs are thereby fixed and simultaneously sealed. Projections 115S are connected to the respective RTDs 115, so that when an excessive drawing force is exerted upon one of the RTDs 115, the projection 115S thereof engages the split plates 121 to prevent the RTD 115 from being withdrawn.

Figure 10:
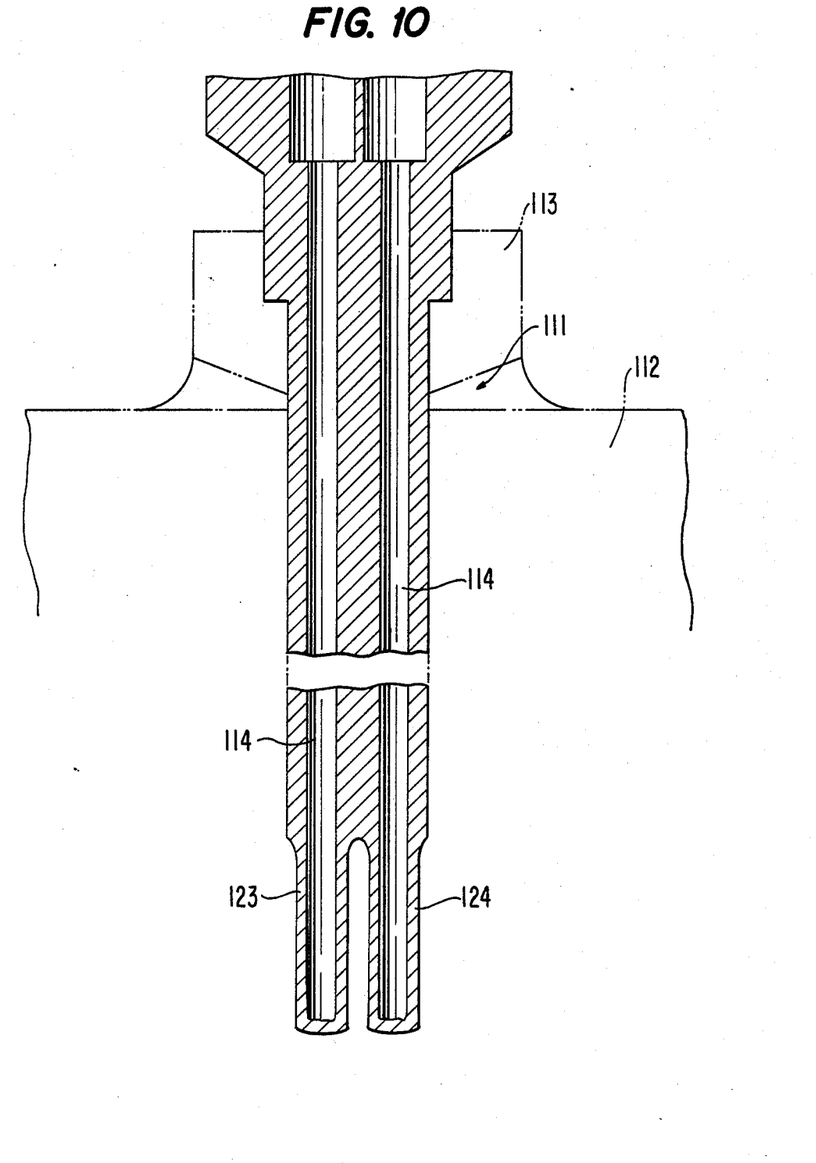
FIG. 10 is a cross-sectional side view of a nipple-shaped protrusion in the temperature measuring arrangement.

As shown in FIG. 10, in the temperature sensing portion at the bottom of the RTD well structure 111 are provided independent nippled-shaped protrusions 123 and 124 in which respective insert holes 114 are formed, and the tip ends of the respective protrusions are closed so that insert holes 114 serve as independent dry wells. A temperature sensing assembly 115a of the respective RTD 115 is inserted into each closed tip end portion of the insert hole 114.

Figure 11:
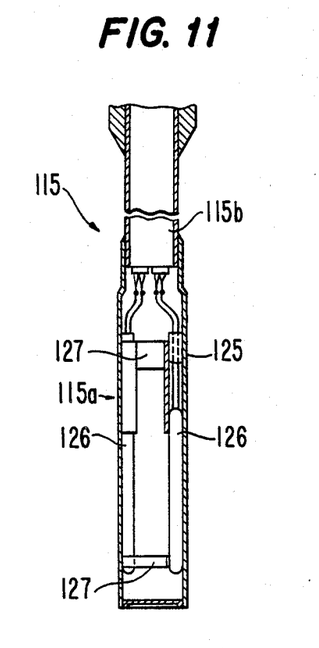
FIG. 11 is a cross-sectional side view of a resistance temperature detector according to the present invention.

The structure of the RTD 115 will now be explained with reference to FIG. 11. The RTD consists of the temperature sensing assembly 115a and a sheath cable assembly 115b connected thereto. Similar to the above-described first preferred embodiment shown in FIGS. 1 to 6, the temperature sensing assembly 115a is composed of a protective case 125 and two resistance elements 126. The protective case 125 has a thin-walled tubular shape. The resistance elements 126 are secured directly to the inner surface of the protective case 125 by an inorganic adhesive having appropriate resistance to thermal and radiation degradation and a high thermal conductivity. The resistance elements 126 are separated by a spacer 127 at an angular interval of 180°. The RTD 115 has an excellent response time because the resistance elements 126 are secured to the inner surface of the protective case 125.

The operation of the RTD well structure 111 having the above-described construction, will now be described. The RTD well structure 111 is welded to the tube stub 113 and the nipple-shaped protrusions 123 and 124 are disposed within the pipe 112 to contacts the fluid to be measured. Two of the RTDs, for normal and backup use, are inserted into respective insert holes 114, and the temperature sensing assembly 115a of each RTD 115 is disposed close to the tip end of the respective insert hole 114. The bottom rings 116, seal packings 118 and junk rings 119 for the respective RTDs 115 are placed in the drum body 116, and thereafter the flange type press metal 120 and the split plate 121 are inserted and fixed by means of the bolts 122. The respective RTDs 115 are thereby individually sealed and fixed to the RTD well structure 111. Thus the RTD 115 for normal use as well as the RTD 115 for backup use are held in the single RTD well structure 111, and the temperature sensing assemblies 115a of the respective RTDs 115 are disposed at essentially the same position within the pipe. Since the respective temperature sensing assemblies 115a are inserted into the insert holes 114 within the independent nipple-shaped protrusions 123 and 124, the fluid can approach the exterior of the respective protrusions 123 and 124 under equal thermo-hydraulic conditions. A fast response rate of the RTD 115 can be realized with the above construction, and the RTD 115 is made optimum for its intended use.

The above-described RTD well structure 111 eliminates the need to later provide an additional RTD well for backup measurement, and therefore additional labor and installation expense are not incurred. Moreover, as the temperature sensing assemblies 115a of the normal and backup RTDs 115 are disposed at essentially the same position, the temperature of the fluid can be measured at the same location. In addition, since the temperature sensing assemblies 115a of the normal and backup RTDs 115 are inserted and held in the independent nipple-shaped protrusions 123 and 124, the temperature of the fluid can be measured under equal thermohydraulic conditions. Furthermore, even if one of the nipple-shaped protrusions 123 and 124 should break, as the normal and preparatory RTD's 115 are independently sealed, soundness of the RTD 115 on the unbroken side can be maintained, and precise temperature measurement continuously effected.

As is apparent from the above description, with the resistance temperature detector according to the present invention, since two resistance elements are provided on an inner surface of a thin-walled tubular sheath temperature sensing assembly with a vacant space therein, even if one of the resistance elements becomes faulty, measurement of fluid temperature can still be done at the same location by means of the other resistance element. In addition, according to the present invention, since the normal and backup resistance elements are provided on the inner surface of the thin-walled tubular sheath temperature sensing assembly, the resistance elements are near the fluid to be measured, thermal conductivity is enhanced, and thermal inertia within the protective case is reduced. There is no fear that degradation of insulation between the conductors of the resistance elements and shunting between lead wires may arise, as the lead wires are independently connected to separate sheathed cables. As a result, continuity of temperature measurement can be insured, the response rate can be greatly enhanced, and the reliability of the temperature detector is improved.

In addition, with the well structure according to the present invention, since it can hold a plurality of resistance temperature detectors and temperature sensing portions are disposed independently of each other within nipple-shaped protrusions, the normal resistance temperature detector and the backup resistance temperature detector can be held at essentially the same location in the fluid, and the fluid to be measured can approach the exterior of the nipple-shaped protrusions under equal thermo-hyraulic conditions. As a result, it is possible to mount a plurality of resistance temperature detectors without lowering the applicability of the measurement. Additional work to install a backup resistance temperature detector can be omitted.

While a principle of the present invention has been described above in connection with preferred embodiments of the invention, it is intended that all matter contained in the above description and illustrated in the accompanying drawings shall be interpreted to be illustrative and not as a limitation to the scope of the invention.

What is claimed is:

1. A resistance temperature detector for measuring the temperature of a fluid flow, comprising:
   a thin-walled tubular case having a first closed end;
   a sheath cable assembly secured to a second end of said tubular case to thereby define a sealed vacant space within said case;
   normal and backup temperature sensing resistance elements secured in spaced circumferential relation directly to the inner annular wall of said case within said sealed vacant space, said resistance elements being secured to the inner wall of said case with an inorganic adhesive; and
   a plurality of insulated lead wires extending between and electrically connecting said normal resistance element and said cable assembly, and extending between and electrically connecting said backup resistance element and said cable assembly.

2. A detector as claimed in claim 1, wherein each of said resistance elements comprises:
   an elongated ceramic mandrel;
   a resistance wire wound about said mandrel;
   a ceramic tube surrounding said mandrel and said wire; and
   end plates connected to said mandrel and said tube at the ends thereof.

3. A detector as claimed in claim 2, wherein said resistance elements are disposed substantially parallel to the longitudinal axis of said tubular case, and
   at least one spacer extends between said resistance elements to assist in maintaining said spaced relation of said resistance elements and the direct contact of said resistance elements and said inner annular wall of said case.

4. A detector as claimed in claim 1, wherein said resistance elements are disposed substantially parallel to the longitudinal axis of said tubular case, and
   at least one spacer extends between said resistance elements to assist in maintaining said spaced relation of said resistance elements and the direct contact of said resistance elements and said inner annular wall of said case.

5. A detector as claimed in claim 1, wherein said sheath cable assembly includes first and second sets of wire conductors, each of said first and second sets having electrical insulation so as to define first and second sheath cables, said plurality of insulated lead wires electrically connected respectively to said first and second sheath cables, and an outer wall encasing both said first and said second sheath cables for at least a portion of the length of said first and said second sheath cables, said second end of said tubular case secured to said outer wall.

6. A detector as claimed in claim 5, further comprising two individually insulated outer cables, one of said outer cables electrically connected to said first sheath cable, the other said outer cable electrically connected to said second sheath cable.

7. A detector as claimed in claim 1, further including a well, said well comprising;
   a first end for mounting to a tube stub of a pipe;
   a second end to extend within the interior of the pipe; and
   a cavity having a first end open at said first end of said well and extending to a closed second end near said second end of said well such that said cavity will extend within the interior of the pipe when said well is mounted to the tube stub; and
   said tubular case and at least a portion of said sheath cable assembly being within said cavity.

8. A detector as claimed in claim 1, further including a well, said well comprising;
   a first end for mounting to a tube stub of a pipe;
   a second end to extend within the interior of the pipe, said second end including a plurality of protrusions extending therefrom substantially in the direction of the longitudinal axis of said well; and
   a plurality of insert holes, equal in number to the number of said protrusions, each of said insert holes having a first end open at the first end of said well and extending to a closed second end within a respective one of said protrusions; and
   said tubular case and at least a portion of said sheath cable assembly being within one of said insert holes such that said tubular case is within the associated one of said protrusions.

9. A resistance temperature detector for measuring the temperature of a fluid flow, comprising:
   a thin-walled tubular case having a first closed end;
   a sheath cable assembly secured to a second end of said tubular case to thereby define a sealed vacant space within said case;
   normal and backup temperature sensing resistance elements, said resistance elements being disposed substantially parallel to the longitudinal axis of said tubular case and secured in spaced circumferential relation directly to the inner annular wall of said case within said sealed vacant space;
   at least one spacer extending between said resistance elements to assist in maintaining said spaced relation of said resistance elements and the direct contact of said resistance elements and said inner annular wall of said case; and
   a plurality of insulated lead wires extending between and electrically connecting said normal resistance element and said cable assembly, and extending between and electrically connecting said backup resistance element and said cable assembly.

10. A detector as claimed in claim 9, wherein each of said resistance elements comprises:
    an elongated ceramic mandrel;
    a resistance wire wound about said mandrel;
    a ceramic tube surrounding said mandrel and said wire; and
    end plates connected to said mandrel and said tube at the ends thereof.

11. A detector as claimed in claim 9, wherein said sheath cable assembly includes first and second sets of wire conductors, each of said first and second sets having electrical insulation so as to define first and second sheath cables, said plurality of insulated lead wires electrically connected respectively to said first and second sheath cables, and an outer wall encasing both said first and said second sheath cables for at least a portion of the length of said first and said second sheath cables, said second end of said tubular case secured to said outer wall.

12. A detector as claimed in claim 11, further comprising two individually insulated outer cables, one of said outer cables electrically connected to said first sheath cable, the other said outer cable electrically connected to said second sheath cable.

13. A detector as claimed in claim 9, further including a well, said well comprising;
    a first end for mounting to a tube stub of a pipe;
    a second end to extend within the interior of the pipe; and
    a cavity having a first end open at said first end of said well and extending to a closed second end near said second end of said well such that said cavity will extend within the interior of the pipe when said well is mounted to the tube stub; and
    said tubular case and at least a portion of said sheath cable assembly being within said cavity.

14. A detector as claimed in claim 9, further including a well, said well comprising;
    a first end for mounting to a tube stub of a pipe;
    a second end to extend within the interior of the pipe, said second end including a plurality of protrusions extending therefrom substantially in the direction of the longitudinal axis of said well; and
    a plurality of insert holes, equal in number to the number of said protrusions, each of said insert holes having a first end open at the first end of said well and extending to a closed second end within a respective one of said protrusions; and
    said tubular case and at least a portion of said sheath cable assembly being within one of said insert holes such that said tubular case is within the associated one of said protrusions.

* * * * *